United States Patent
Chew et al.

(10) Patent No.: US 10,561,986 B2
(45) Date of Patent: Feb. 18, 2020

(54) METHOD AND SYSTEM FOR APPLYING SUPERIMPOSED TIME-VARYING FREQUENCY ELECTROMAGNETIC WAVE TO WATER TO EFFECT VARIOUS TREATMENT FUNCTIONS

(71) Applicant: SEMB-ECO R&D PTE LTD, Singapore (SG)

(72) Inventors: Hwee Hong Chew, Singapore (SG); Poh Kwee Ong, Singapore (SG)

(73) Assignee: SEMB-ECO R&D PTE LTD, Singapore (SG)

(*) Notice: Subject to any disclaimer, the term of this patent is extended or adjusted under 35 U.S.C. 154(b) by 0 days.

(21) Appl. No.: 15/748,520

(22) PCT Filed: Jul. 28, 2016

(86) PCT No.: PCT/SG2016/050362
§ 371 (c)(1),
(2) Date: Jan. 29, 2018

(87) PCT Pub. No.: WO2017/018944
PCT Pub. Date: Feb. 2, 2017

(65) Prior Publication Data
US 2018/0222778 A1 Aug. 9, 2018

(30) Foreign Application Priority Data
Jul. 29, 2015 (WO) ................ PCT/SG2015/050239

(51) Int. Cl.
*C02F 1/46* (2006.01)
*B01D 53/96* (2006.01)
(Continued)

(52) U.S. Cl.
CPC ......... *B01D 53/965* (2013.01); *B01D 53/323* (2013.01); *B01D 53/504* (2013.01);
(Continued)

(58) Field of Classification Search
CPC .... B01D 53/323; B01D 53/965; B01D 53/60; B01D 53/504; B01D 53/507; B01D 53/56;
(Continued)

(56) References Cited

U.S. PATENT DOCUMENTS

| 4,781,805 A | 11/1988 | Dahlgren |
| 4,865,748 A | 9/1989 | Morse |

(Continued)

FOREIGN PATENT DOCUMENTS

| GB | 1527692 | 10/1978 |
| WO | WO-2007/015684 A1 | 2/2007 |

OTHER PUBLICATIONS

International Search Report and Written Opinion, issued in the corresponding PCT application serial No. PCT/SG2016/050362, dated Jan. 13, 2017, 13 pages.

*Primary Examiner* — Arun S Phasge
(74) *Attorney, Agent, or Firm* — Cesari and McKenna, LLP

(57) ABSTRACT

The invention relates to a method and system for treating water within a water system to control one or more of scaling, corrosion, bacteria and algae. In particular, the invention relates to methods and systems for applying a superimposed time-varying frequency electromagnetic wave comprising both AC and DC components in a pulsating manner to water within a water system, such as, for example, cooling water systems, cooling towers, boiler systems and water storage systems. The method and the system of the invention significantly reduce capital costs and require very low energy, they avoid environmentally unfriendly final products, and are able to result in various treatment effects simultaneously.

22 Claims, 12 Drawing Sheets

(51) Int. Cl.
| | |
|---|---|
| B01D 53/78 | (2006.01) |
| B01D 53/32 | (2006.01) |
| B01D 53/50 | (2006.01) |
| B01D 53/60 | (2006.01) |
| C02F 1/00 | (2006.01) |
| C02F 1/32 | (2006.01) |
| C02F 1/48 | (2006.01) |
| C02F 1/461 | (2006.01) |
| C25D 11/00 | (2006.01) |
| C25D 11/02 | (2006.01) |
| C25D 11/34 | (2006.01) |
| C25D 11/38 | (2006.01) |
| B01D 53/56 | (2006.01) |
| B01D 53/62 | (2006.01) |
| C02F 5/00 | (2006.01) |
| C23F 13/04 | (2006.01) |
| C23F 13/06 | (2006.01) |
| C02F 103/00 | (2006.01) |
| C02F 103/08 | (2006.01) |
| C02F 103/18 | (2006.01) |

(52) U.S. Cl.
CPC ........... *B01D 53/507* (2013.01); *B01D 53/56* (2013.01); *B01D 53/60* (2013.01); *B01D 53/62* (2013.01); *B01D 53/78* (2013.01); *C02F 1/004* (2013.01); *C02F 1/32* (2013.01); *C02F 1/4602* (2013.01); *C02F 1/46104* (2013.01); *C02F 1/484* (2013.01); *C02F 1/487* (2013.01); *C02F 5/00* (2013.01); *C23F 13/04* (2013.01); *C23F 13/06* (2013.01); *C25D 11/005* (2013.01); *C25D 11/022* (2013.01); *C25D 11/34* (2013.01); *C25D 11/38* (2013.01); *B01D 2252/103* (2013.01); *B01D 2252/1035* (2013.01); *B01D 2257/302* (2013.01); *B01D 2257/404* (2013.01); *B01D 2257/504* (2013.01); *B01D 2258/0283* (2013.01); *C02F 2103/007* (2013.01); *C02F 2103/008* (2013.01); *C02F 2103/08* (2013.01); *C02F 2103/18* (2013.01); *C02F 2201/4614* (2013.01); *C02F 2201/46125* (2013.01); *C02F 2201/46175* (2013.01); *C02F 2201/483* (2013.01); *C02F 2303/04* (2013.01); *C02F 2303/08* (2013.01); *C02F 2303/20* (2013.01); *C23F 2213/32* (2013.01)

(58) Field of Classification Search
CPC .. B01D 53/62; B01D 53/78; B01D 2257/404; B01D 2257/504; B01D 2257/302; B01D 2258/0283; B01D 2252/103; B01D 2252/1035; C02F 1/46104; C02F 5/00; C02F 1/4602; C02F 1/004; C02F 1/32; C02F 1/484; C02F 1/487; C02F 2201/4614; C02F 2103/008; C02F 2103/18; C02F 2103/08; C02F 2103/007; C02F 2303/20; C02F 2303/04; C02F 2303/08; C02F 2201/46125; C02F 2201/483; C25D 11/002; C25D 11/005; C25D 11/38; C25D 11/34; C23F 13/06; C23F 13/04; C23F 2213/32
See application file for complete search history.

(56) References Cited

U.S. PATENT DOCUMENTS

| | | |
|---|---|---|
| 5,074,998 A | 12/1991 | De Baat Doelman |
| 5,326,446 A | 7/1994 | Binger |
| 2003/0015479 A1 | 1/2003 | Kuennen et al. |
| 2011/0174304 A1 | 7/2011 | Triplett, II et al. |
| 2018/0201526 A1* | 7/2018 | Chew et al. ............ C02F 1/484 |

* cited by examiner

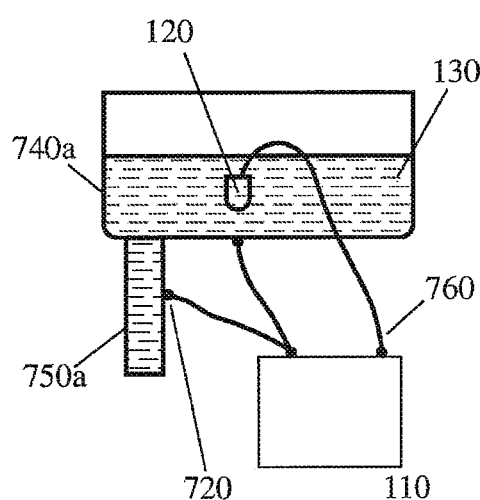
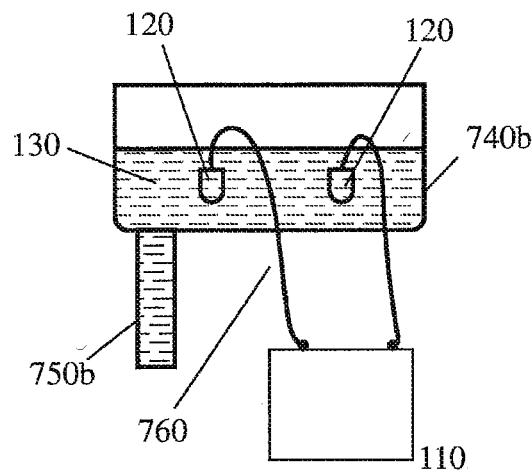
Fig. 12A
Fig. 12B
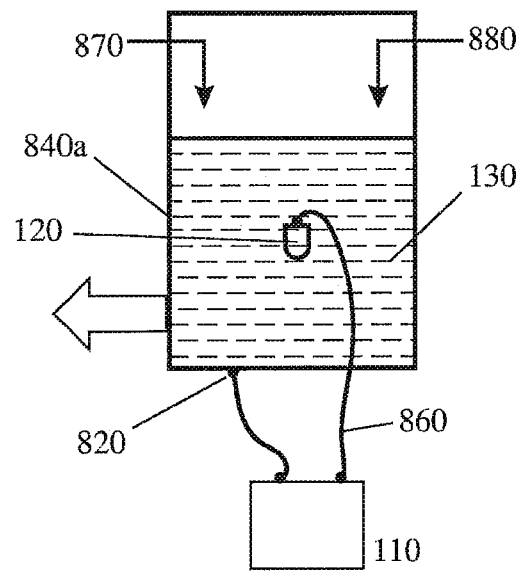
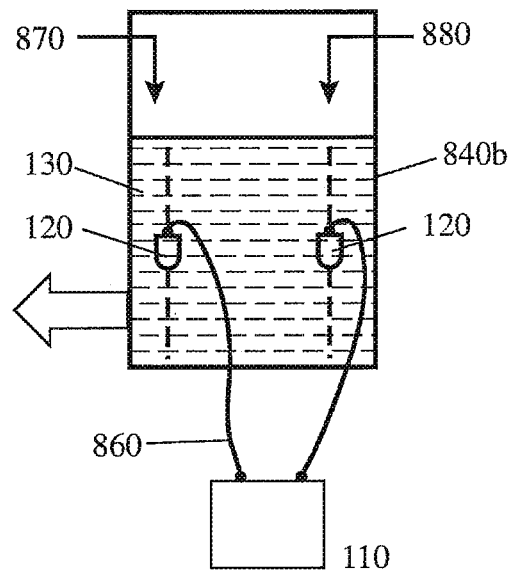
Fig. 13A
Fig. 13B

METHOD AND SYSTEM FOR APPLYING SUPERIMPOSED TIME-VARYING FREQUENCY ELECTROMAGNETIC WAVE TO WATER TO EFFECT VARIOUS TREATMENT FUNCTIONS

CROSS-REFERENCE TO RELATED APPLICATIONS

This application is the National Stage of International Application No. PCT/SG2016/050362, filed Jul. 28, 2016, which claims the benefit of priority of International Application No. PCT/SG2015/050239, filed Jul. 29, 2015, the contents of both being incorporated by reference in their entirety for all purposes.

FIELD OF THE INVENTION

This invention relates generally to the field of treatment of an object or a region in order to utilize one or more treatment effects. More particularly, the invention relates to methods and systems for applying DC superimposed time-varying frequency AC pulsed electromagnetic wave (DAC) comprising both AC and DC components in pulsating manner to water within a water system, such as, for example, cooling water systems, cooling towers, boiler systems and water storage systems.

BACKGROUND OF THE INVENTION

In many cases, treatment of an object or a region formed by the object and the medium surrounding the object, such as water and water systems, is necessary in order for treatment effects to be carried out, such as preventing corrosion, controlling bacteria and biological growth, controlling scale formation, water-hardness softening, and the like.

Water contains many different substances either in compound or ionic forms. These contents are beneficial in some usages but could also create undesirable effects in some applications. For cooling water and boiler water systems, contents such as calcium, silica, carbonates, oxygen etc. may contribute to mineral scaling, corrosion, bacteria issues etc. Commonly, these undesirable issues are controlled by using chemical or physical water treatment methods. However, existing chemical and physical treatment systems available in the market have their shortcomings. They either create undesirable impacts to the environment or are ineffective in all round treatment. One of the objects of this invention is to overcome the treatment deficiencies of both the existing chemical and non-chemical treatment methods without further creating negative impact to the environment, whilst still providing a practical and efficacious system and method that can be implemented in various applications, especially for cooling water and boiler water treatment.

Presently, for closed system such as closed loop cooling water systems, various physical and chemical treatment methods as well as electrolysis methods are employed to obtain the respective treatment effects including scaling, corrosion and biological controls. For example, physical treatment methods include methods of permanent or electromagnet treatment, high voltage electrostatic treatment, and ultraviolet light treatment but they are for scaling or biological control without corrosion control function. The chemical treatment methods are based on chemical reactions, in which chemicals which may be harmful to the environment are used and frequently the products created as a result of the chemical reactions are also environmentally unfriendly. One example of a chemical treatment method is for chemicals such as phosphate-based scale/corrosion inhibitors to be used to keep calcium ions remaining dissolved in water without precipitation and provide a protective product to coat the corrosion anode or cathode sites, in order for the control of scaling and corrosion issues in water.

In view of the above, prior art physical and chemical treatment methods have deficiencies and limitations and these impede their full practical implementation in actual applications. The chemical treatment methods are known to do harm to the environment and physical treatment methods are generally designed for single purpose applications, to solve only one of the many treatment issues with only one treatment effect being achieved. Such methods do not solve all the problems simultaneously unless different physical methods are used together. However, in practice many of them resort to using environmentally unfriendly chemicals to meet all the treatment expectations.

Among the physical methods, some use either direct current (DC) or pure AC time-varying frequency electromagnetic waves for various treatment effects. For the DC current-based methods, only constant DC is applied without the AC alternating wave. For the pure AC time-varying frequency electromagnetic wave-based methods, only the AC alternating wave is applied and will not produce the effects of DC. Even if the DC and AC methods are applied separately at the same time, the result of such a combination is to produce a static DC current and the effects of a pure AC wave.

Moreover, none of these prior art systems and methods solve the problems of algae and *Legionella* bacteria in the most challenging cooling tower environments which are most conducive for algae and *Legionella* bacteria growth. Typically, AC electromagnetic treatment can reduce the total bacteria count in the cooling tower if the correct frequency and strength are applied, but not the *Legionella* bacteria count. This is because *Legionella* bacteria are not sensitive to an indirect AC electromagnetic "field" treatment although some other bacteria species are more responsive. Onsite treatment results have shown that when treated by inductor coil AC electromagnetic alternating fields without the aid of other disinfection chemicals or devices, total bacteria count can be lowered but the *Legionella* count remains high. Hence for *Legionella* control, the use of environmental unfriendly chlorine disinfection methods is needed. In fact the frequency ranges used by some of the AC pulsed electromagnetic field treatment methods may actually promote the growth of *Legionella* bacteria or some other bacteria species. One of the main reasons for ineffectiveness in bacteria or *Legionella* bacteria control is due to the field treatment which has no ionic current in the water to produce a direct mechanism to kill the bacteria.

It has been always a challenge to develop alternative technologies for obtaining various treatment effects that are effective and cause no harm to the environment, and that advantageously are also able to achieve the various treatment effects all in one go. Therefore, there is a need for new methods and systems that are capable of simultaneously achieving the various treatment effects, and do not cause harm to the atmosphere, aqueous and soil environments and that do not require storage and disposal of final products and by-products.

The listing or discussion of an apparently prior-published document in this specification should not necessarily be taken as an acknowledgement that the document is part of the state of the art or is common general knowledge.

SUMMARY OF THE INVENTION

The present invention has been developed to fulfill the needs noted above and therefore has the advantage of providing a system for applying DC superimposed time-varying frequency AC pulsed electromagnetic wave (DAC) to a target object or a target region which is environmentally sound and does not leach chemicals products into the surroundings. The present invention utilizes the methods and systems described in the application from which this application claims priority, and further provides specific methods and systems for treating water within a water system.

Another advantage of the invention is that it can provide a system for applying a DC super-imposed time-varying frequency AC pulsed electromagnetic wave (DAC) to water within a water system which is significantly more economical and convenient to utilize than prior art systems.

Additionally, the invention provides a system for applying a (DAC) superimposed time-varying frequency electromagnetic wave to water within a water system which allows for achievement of various desired treatment effects simultaneously.

The invention provides a method for treating water within a water system to control one or more of scaling, corrosion, bacteria and algae in accordance with Claim 1 of the appended claims. The invention further provides a system for treating water within a water system to control one or more of scaling, corrosion, bacteria and algae in accordance with Claim 20 of the appended claims.

According to the invention, the DC biasing unit may be selected from the group consisting of a switch mode DC power supply, an AC to DC converter, a rechargeable DC battery and an inductive diode filter. The device for generating the (DAC) superimposed time-varying frequency electromagnetic wave may be provided as a prefabricated electronic circuit. The DC biasing unit may provide a variable DC bias voltage or a fixed DC bias voltage according to the actual needs and requirements of a particular situation.

In some cases, the DC bias voltage is selected such that the superimposed time-varying frequency electromagnetic wave is produced to have polar asymmetry or become a unidirectional pulsating wave, or the DC biasing unit is selected to produce the superimposed time-varying frequency electromagnetic wave that has half-wave distortion or full-wave distortion.

The positions of the first and second excitation sites may be varied according to the actual needs and requirements. The two excitation sites may be arranged in the water or on a same surface of the water system in a spaced relation or on two different surfaces of the water system or may be arranged in the water and on one or more surfaces of the water system.

In one embodiment of the invention, the AC wave generator comprises a control unit configured to generate a signal having the time-varying frequency AC electromagnetic wave at the desired sweeping time, and one or more bridge-type circuits coupled to the control unit for receiving the signal generated from the control unit, the bridge-type circuit being driven by the received signal to generate and amplify the AC driving signal of the time-varying frequency AC electromagnetic wave, wherein the bridge-type circuit is configured to comprise one or more half-bridge driver integrated circuits (ICs) and one or more Metal Oxide Semiconductor Field Effect Transistors (MOSFETs) coupled to the respective half-bridge driver ICs. In another embodiment of the invention, the control unit comprises a programmable integrated circuit (IC) for time-varying the frequency of the AC driving signal, and optionally a stabilizer circuit for stabilizing the AC driving signal.

Advantageously, the frequency of the superimposed time-varying frequency electromagnetic wave is between about 100 Hz and about 1 MHz, preferably between about 100 Hz and about 200 KHz. The sweeping frequency of the superimposed time-varying frequency electromagnetic wave is between about 1 Hz and about 1 KHz, preferably between about 10 Hz and about 100 Hz.

Unlike the methods and systems known in the prior art, the essence of the invention is to use the superimposed time-varying frequency electromagnetic wave (DAC) to apply onto the object or the region to be treated. Therefore, the object or the region is simultaneously subjected to the effect of the AC electrical and magnetic fields and to the effect of pulsating AC/DC component. As a result, the current produced in the conductive object or in the medium may carry the pulsating positive and negative charged ions, electrons or other charges, which increases the vibration and rotational internal energy of molecule clusters and dissolved ions as well as causing direct excitation of the object and the medium. In this way, various treatment effects can be obtained effectively, due to the pulsating ionic electromagnetic wave nature. Importantly, in the prior art pure AC or pure DC methods and systems there is no pulsating physical ionic wave current, ions or charges flowing in the water. instead of either no current for a pure AC system, or no pulsating nature of current in a DC system which are in direct contrast to the mechanism of the current invention and which is needed to control bacteria and algae effectively.

According to an aspect the invention, there is disclosed a method and a system for treating blast water.

According to another aspect of the invention there is disclosed a method and a system for preventing corrosion of at least one metallic structure in an electrolyte medium.

To have a better understanding of the invention, reference is made to the following non-limiting description of the invention and embodiments thereof in conjunction with the accompanying drawings.

BRIEF DESCRIPTION OF THE DRAWINGS

FIGS. 12A and 12B are schematic views of an exemplary superimposed DC pulsating ionic wave current system in accordance with the invention for treatment of water in a cooling tower system for metallic and non-metallic structures, respectively.

FIGS. 13A and 13B are schematic views of an exemplary superimposed DC pulsating ionic wave current system in accordance with the invention for treatment of water in a boiler system for metallic and non-metallic structures, respectively.

In the drawings, like parts are designated by like reference numerals.

DETAILED DESCRIPTION OF THE PREFERRED EMBODIMENTS

While this invention is illustrated and described in relation to non-limiting preferred embodiments of the invention, the system for applying a superimposed time-varying frequency electromagnetic wave to a target object or a target region may be produced in many different configurations, sizes, forms and materials.

The term "medium" used herein may refer to a conductive electrolyte including gas, a liquid or a solid or any combination thereof, which surrounds the object, and the medium and the object form together a region that requires for desirable treatment effects. Advantageously, the medium is ionized or conductive, for example an electrolyte such as water, oil, soil and the like. In preferred embodiments of the invention, the medium comprises water.

The term "actuator" or "emitter" used herein refers to an element that is able to employ the superimposed time-varying frequency electromagnetic wave (DAC) to energize the target object or the target region, such that the target object or region is subject to the treatment of the superimposed time-varying frequency electromagnetic wave (DAC).

FIGS. 1 to 10 and the corresponding following description relate to methods and systems for producing a superimposed DC pulsing ionic wave current. FIGS. 11 to 14 and the corresponding description relate to the specific invention with respect to the methods and systems for treating water within a water system to control one or more of scaling, corrosion, bacteria and algae.

Figure 1:
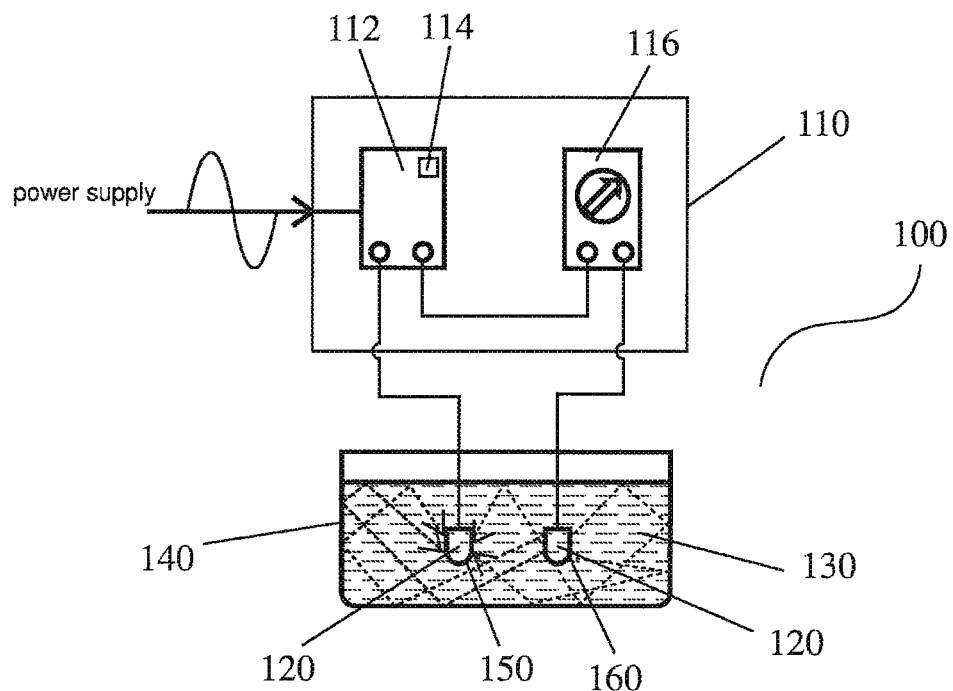
FIG. 1 is a schematic view of an exemplary arrangement of a superimposed time-varying frequency electromagnetic wave system which is constructed in accordance with a first embodiment of the invention.

Referring now to the drawings, FIG. 1 illustrates a system 100 constructed consistent with a first embodiment of the present invention. In this embodiment, the system 100 comprises a device 110 for generating a superimposed time-varying frequency electromagnetic wave. The device 110 comprises an alternating current (AC) wave generator 112 and a direct current (DC) biasing unit 116, which is electrically coupled in series with the AC wave generator 112.

The system 100 further comprises two actuators 120 each electrically coupled with a respective output terminal of the device 110.

As shown in FIG. 1, the actuators 120 are immersed in a conductive liquid 130 (i.e. water) contained in a container 140. The actuator of the invention serves to energize the conductive liquid 130 with the superimposed time-varying frequency electromagnetic wave. A first excitation site 150 and a second excitation site 160 are arranged in spaced relation in the liquid, their connection with the actuators 120 being such as not to cause any problem of short circuiting. The device 110, the actuators 120 and the conductive liquid 130 form together a closed loop circuit. In this embodiment, the liquid (water) 130 is to be treated for the purposes of control of bacteria and biological growth, control of scale formation, and/or control of water-hardness for softening. The material of the actuators 120 can be any metals, solid conductive materials or materials coated with conductive material, and can be selected from the group consisting of steel, copper, zinc, graphite, stainless steel, titanium, metal oxide coated titanium and the like. The shape of the actuators 120 can be of any geometrical shape including round, square, rectangular and/or triangular, and may be provided in the form of bars, rods, tubes, dishes, plates, spheres, cubes, hollow forms, solid forms, perforated forms, meshes, etc. The actuators 120 may be immersed in the liquid, or can effect a direct excitation on the conductive materials including metallic and non-metallic materials or structures.

Figure 10:
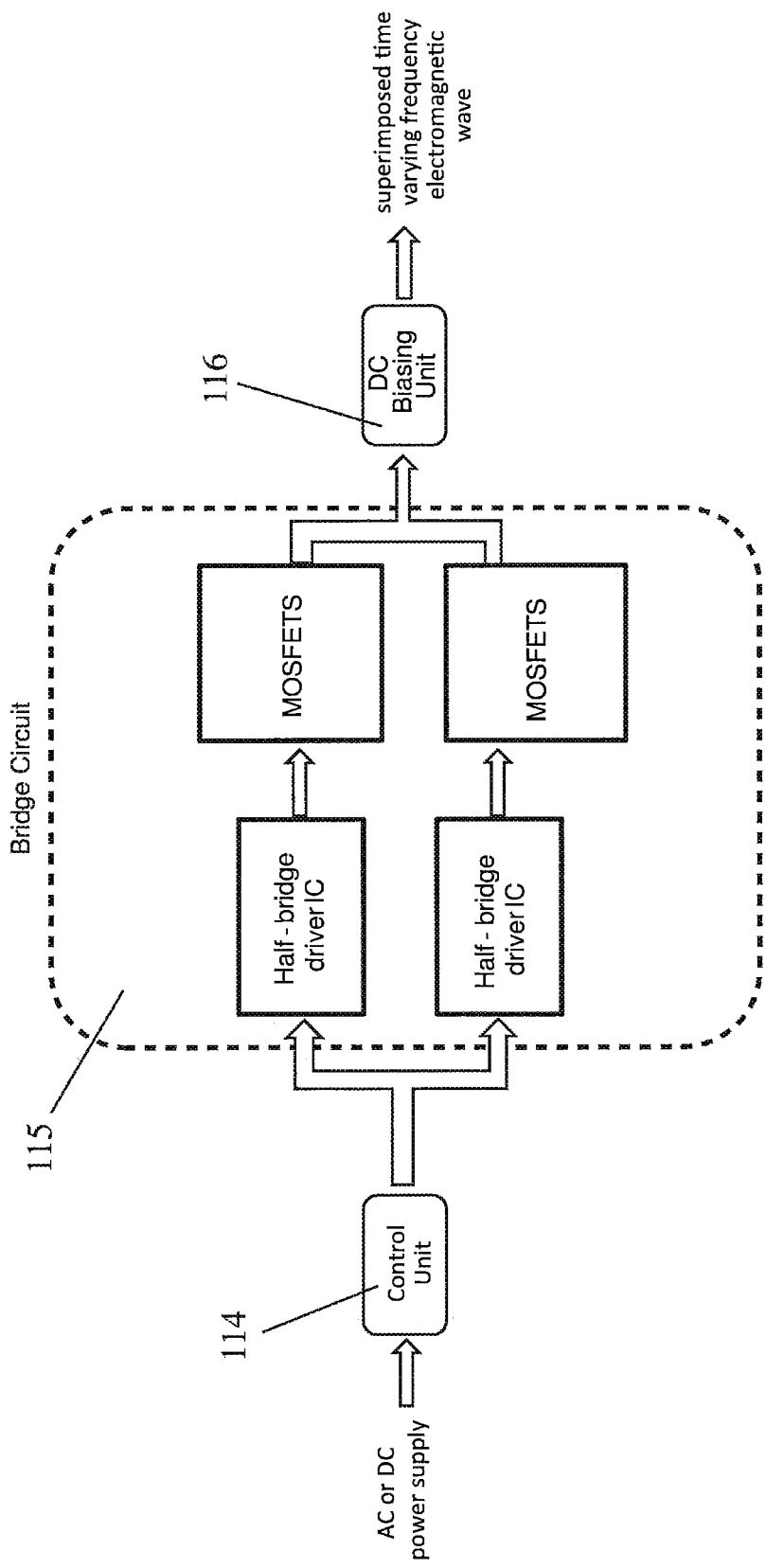
FIG. 10 is a schematic view of an exemplary AC wave generator.

The AC wave generator 112 is electrically coupled with a power supply and configured for generating an AC driving signal of AC electromagnetic wave having a time-varying frequency at a desired sweeping time. The power supply can be a DC or AC power supply. In the preferred embodiment of the invention, the power supply is advantageously of DC nature and provides an input DC signal to the AC wave generator 112. As illustrated in FIG. 10, the AC wave generator 112 in this embodiment comprises a control unit 114 configured and programmed to generate a signal having the desired time-varying frequency at the desired sweeping time, this signal generated by the control unit 114 is in the magnitude of milli-amperes.

The AC wave generator 112 further comprises one or more bridge-type circuits 115 electrically coupled to the control unit 114 to receive the signal generated by the control unit 114. The bridge-type circuit 115 is configured to be driven by the received signal to generate and amplify an AC driving signal in the magnitude of milli-ampere to ampere, for example. This AC driving signal corresponds to the time-varying frequency AC electromagnetic wave having the desired sweeping time and is delivered to the DC biasing unit 116 for superposition on the DC output. The bridge-type circuit 115 comprises two sets of sub-circuits in parallel as illustrated. Each of the sub-circuits comprises a half-bridge driver integrated circuit in connection with two or more MOSFETs. If the main AC source is applied, an AC-to-DC converter may be embedded in the AC wave generator 112 for converting the AC power supply to a DC power supply which is then applied to the control unit 114. The power supply applies to the AC wave generator 112 a voltage according to the actual applications, for example between about 12V to about 200V.

The various electronic components in the AC wave generator 112 may be provided on a printed circuit board (PCB). If an AC-to-DC converter or rectifier is needed, it may also be mounted on the PCB as a compact structure.

As described above, the control unit 114 generates the time-varying frequency signal at the desired sweeping time. The sweeping time is selected to ensure the liquid is exposed to the corresponding frequency for the correct exposure time period. For different applications, a wide range of frequencies may be selected. Preferably, the frequency of the superimposed time-varying frequency electromagnetic wave used in the invention may be in the range of 100 Hz to 1 MHz, and preferably in the range of 100 Hz to 200 kHz; with the sweeping frequency being between about 1 Hz to 1 kHz, and preferably in the range of 10 Hz and 100 Hz. The wave form of the superimposed time-varying frequency electromagnetic wave can be square, triangular, rectangular, sinusoidal or other forms. In this embodiment, the control unit 114 comprises a programmable integrated circuit (IC) for time-varying the frequency of the AC driving signal, and a stabilizer circuit for stabilizing the AC driving signal.

The direct current (DC) biasing unit 116 is electrically coupled in series with the AC wave generator 112 and configured for producing a DC output with a predefined DC bias voltage which may be varied or fixed. The DC biasing unit 116 is programmed such that the DC output is mixed with the amplified AC driving signal received from the AC wave generator 112 to produce the superimposed time-varying frequency electromagnetic wave where the time-varying AC wave is riding on the predefined DC bias voltage. In this embodiment, the DC biasing unit 116 is a switch mode DC power supply. A rechargeable DC battery or AC-to-DC rectifier power supply are possible alternatives for the DC biasing unit 116. When a rechargeable DC battery is used as the DC biasing unit 116, an extremely pure DC output can be generated and is particularly suitable for some applications requiring an extremely pure DC source.

It is advantageous that the DC bias voltage matches the voltage and frequency of the AC pulsating wave coming from the AC wave generator 112. In general the DC bias voltage is lower than the time-varying pulsating wave voltage. The DC bias voltage is therefore adjustable to suit the different on-site treatment requirements. In some cases, the DC bias source is configured to be able to take an inflow of current/voltage if the time-varying pulsating AC wave should surge into the DC bias source.

One feature of the invention is that the unique superimposed time-varying frequency electromagnetic wave can be generated only when the right combination of the AC wave generator 112, the DC biasing unit 116 and the actuators 120 are connected to one another in series.

The superimposed time-varying frequency electromagnetic wave of the invention is different from the simple combination of applying a DC component and a separate time-varying frequency AC wave. If a DC component is separately applied to a time-varying frequency AC wave, there is no superimposed DC pulsed wave produced or presented in the liquid. The DC component is static and would exert separately its own DC effect, and the separate time-varying frequency AC wave, which is balanced in positive and negative amplitude without the DC characteristics, would exert its own effect too.

Figure 5A:
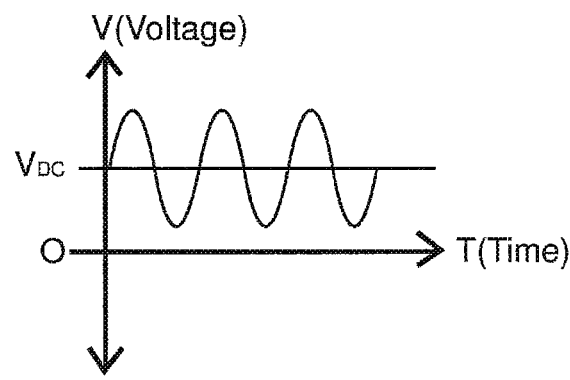
FIG. 5A to 5C are schematic views of first exemplary wave forms of the superimposed time-varying frequency electromagnetic wave.
Figure 5B:
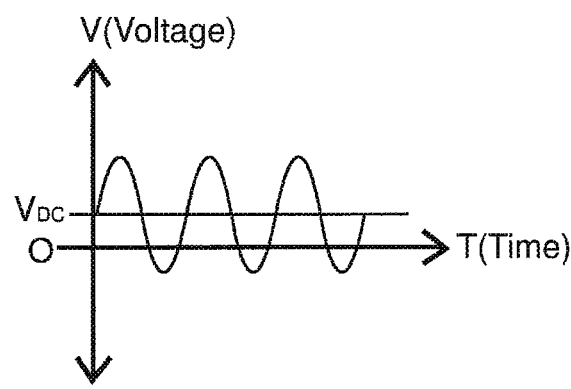
Figure 5C:
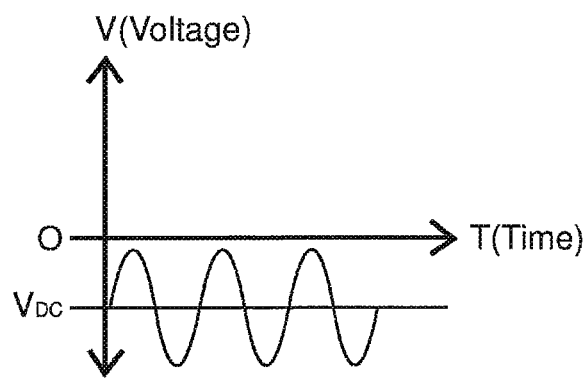
Figure 6A:
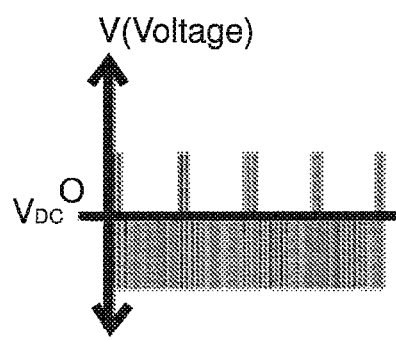
FIG. 6A to 6D are schematic views of second exemplary wave forms of the superimposed time-varying frequency electromagnetic wave.
Figure 6B:
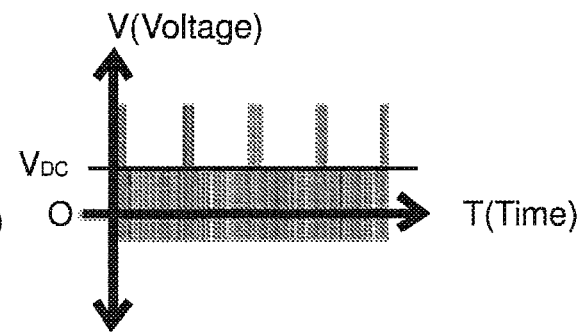
Figure 6C:
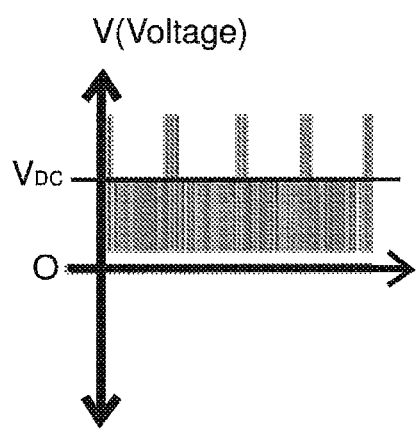
Figure 6D:
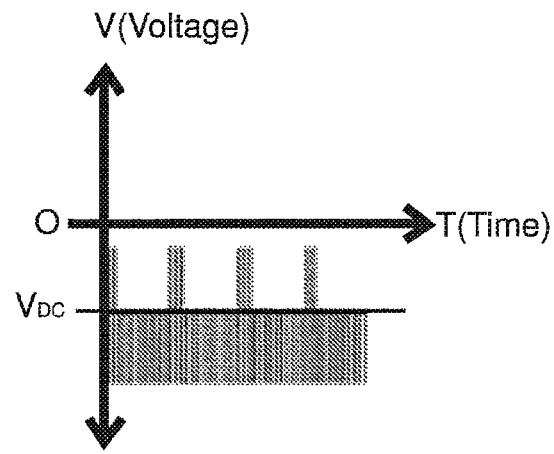
Figure 7A:
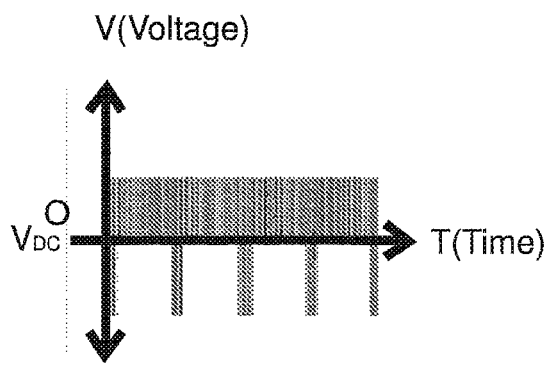
FIG. 7A to 7D are schematic views of third exemplary wave forms of the superimposed time-varying frequency electromagnetic wave.
Figure 7B:
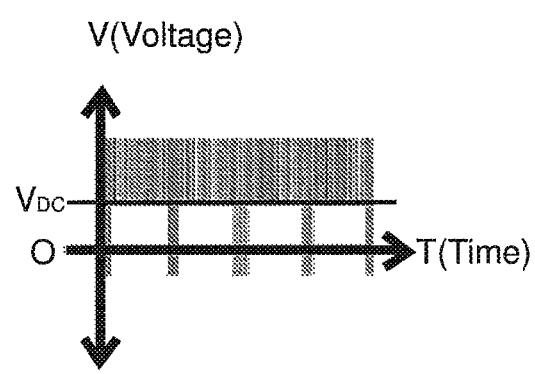
Figure 7C:
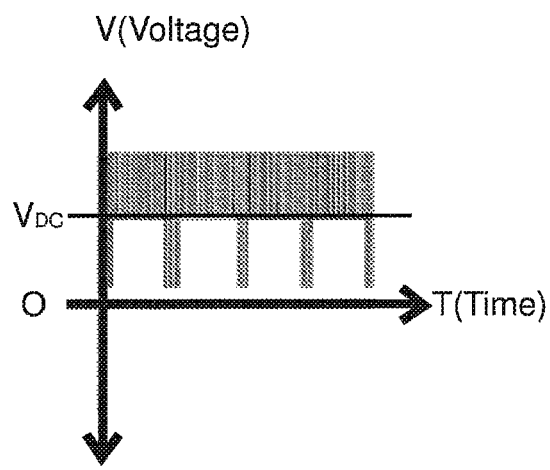
Figure 7D:
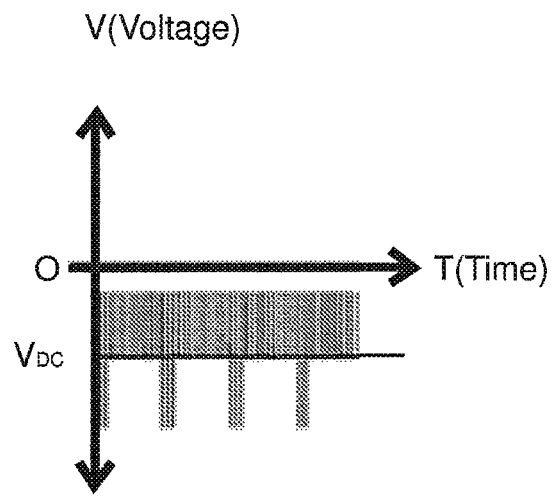

When the input DC signal is provided to the AC wave generator 112, the generator 112 generates and amplifies an AC driving signal corresponding to the time-varying frequency AC electromagnetic wave at a specific sweeping time, which is a wave for example in sine wave form (see FIGS. 5A to 5C). The amplified AC driving signal of the time-varying frequency AC alternating electromagnetic wave is delivered to the DC biasing unit 116 where the DC bias output having a predefined bias voltage $V_{DC}$ is mixed with the AC driving signal. The result of such a mix is an AC-DC superimposed signal where the time-varying AC electromagnetic wave is riding on the DC preset level to produce the superimposed time-varying frequency electromagnetic wave (hereinafter called "DAC wave") having a mixed-frequency voltage. In the DAC wave, the DC component is not static but rather travels in a pulsating and time-varying manner along with the AC component. Therefore, there will be a pulsing ionic wave current containing the DC component produced in the liquid 130, i.e. there are physical ions or charges flowing in the liquid 130, which is an important and distinguishing feature of the invention. After being subject to such an ionic wave current, the internal energy including the vibrational and rotational energy of the liquid is changed, which results in the liquid molecule clusters carrying electrons. This can change the clustering arrangement of the liquid molecule, and more importantly, the energy can be stored in the liquid for a period of time before it is completely dissipated to the surroundings. The stored energy in the liquid plays an important role for the various treatment effects.

In some cases, it is necessary to control the DAC wave to have a controllable DC superimposition magnitude. For example, when the DAC wave is applied for bio-fouling control purposes, the DC biasing voltage $V_{DC}$ may be set such that the DC superimposition magnitude can be controlled to vary between −60 V to +60 V in continuous variations or in steps, and of course higher voltage can be applied. In general the maximum limit of the DC imposition magnitude is determined by safety operating limits and is controlled to be less than the pulsating wave peak voltage. The negative and positive polarity may be set permanently or be controlled by switching the terminal polarity at a pre-programmed frequency or manually.

The polarity of the DAC wave is characterized mainly by the DC component and depends on the polarity of the DC component and the overall loop power source current flow direction. The average voltage of the DAC wave can be seen as having two components, one being the AC amplitude and the other being the DC bias voltage. Each of these magnitudes has its own function, but also they often provide a synergy effect to each other. In some scenarios, a large AC voltage amplitude is necessary, for example, to deter the attachment of bio-organisms. In other scenarios, the DC magnitude (i.e. the DC bias voltage) is important, for example in providing sufficient current density covering the structure surfaces to be protected in corrosion control to meet full corrosion protection criteria. Also, the ratio of AC to DC amplitudes is important in some applications, such as controlling the types of disinfectant effect produced. High DC magnitude can generate more long residual life disinfectant whereas a high AC magnitude can produce more short life disinfectant. Therefore, the AC amplitude voltage and the DC bias voltage may be adjusted and selected according to the actual applications required of the DAC wave.

In this embodiment of the invention, the polarity of the DAC wave may be changed asymmetrically as shown in FIGS. 5A to 5C. In FIG. 5A the DAC sine wave never goes negative, in FIG. 5C the DAC sine wave never goes positive, and in FIG. 5B the DAC sine wave spends more time positive than negative. One of the methods for changing the polarity of the DAC wave is to configure the DC biasing unit to give different DC bias voltages $V_{DC}$ so that the polarity of the DAC sine wave may be varied, if desired.

Figure 8A:
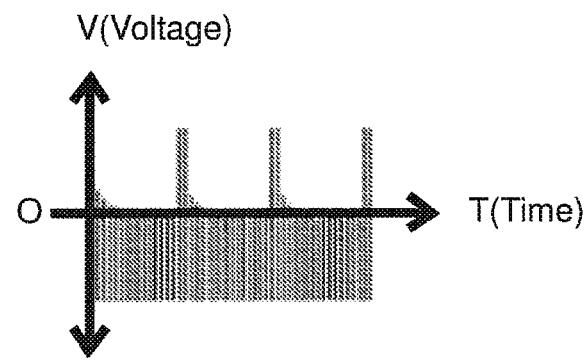
FIG. 8A to 8C are schematic views of fourth exemplary wave forms of the superimposed time-varying frequency electromagnetic wave.
Figure 8B:
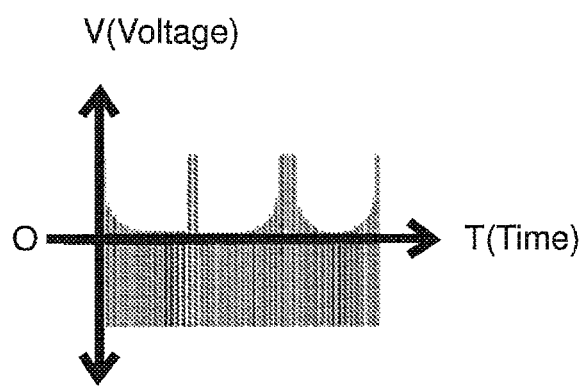
Figure 8C:
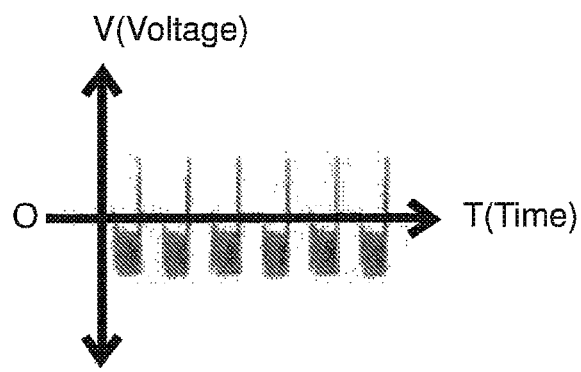

Non-sine wave forms are possible for the invention, for example square waves, rectangular waves, triangular waves or the like. FIGS. 6A to 6D and FIGS. 7A to 7D illustrate some possible variations of the wave forms. In certain applications of the DAC wave, such as when the DAC wave is applied to water in order to prevent bio-fouling, using a distorted waveform instead of a regular waveform can result in a better effect for bio-organism control. It is believed that the bio-organisms find it more difficult to adapt to the changes in waveform and hence a more effective disinfection result can be realized. In FIGS. 8A to 8C, there are illustrated some examples of wave distortion. The distorted wave may be obtained by filtering diodes or filter circuit means; or the AC wave generator may be programmed to produce many other possible distorted waveforms.

Figure 2:
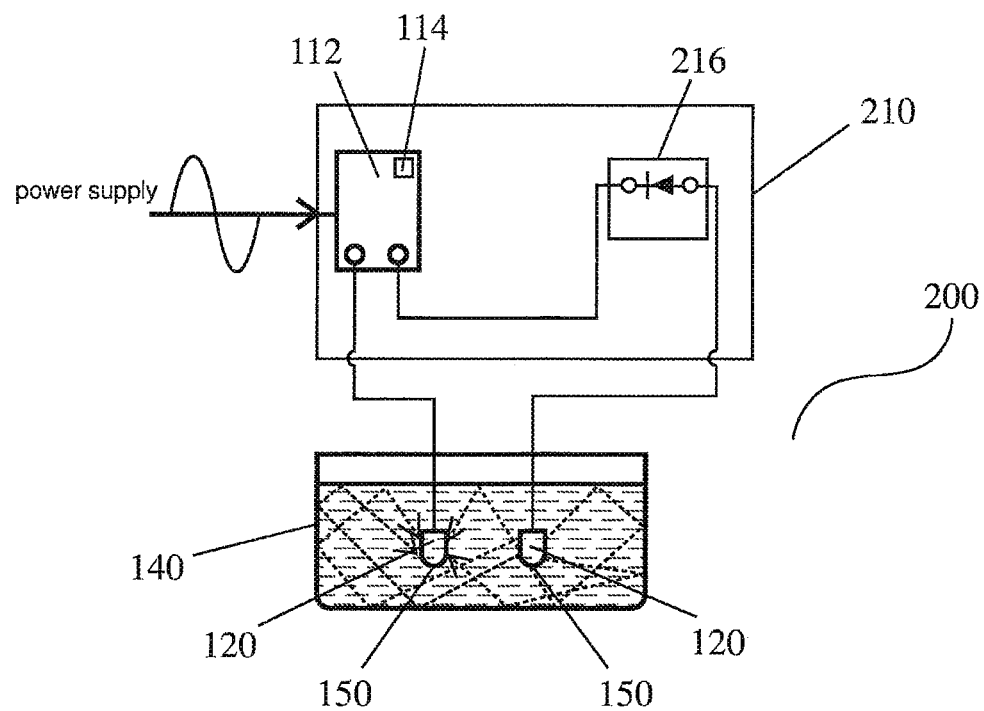
FIG. 2 is a schematic view of an exemplary arrangement of a superimposed time-varying frequency electromagnetic wave system which is constructed in accordance with a second embodiment of the invention.
Figure 9A:
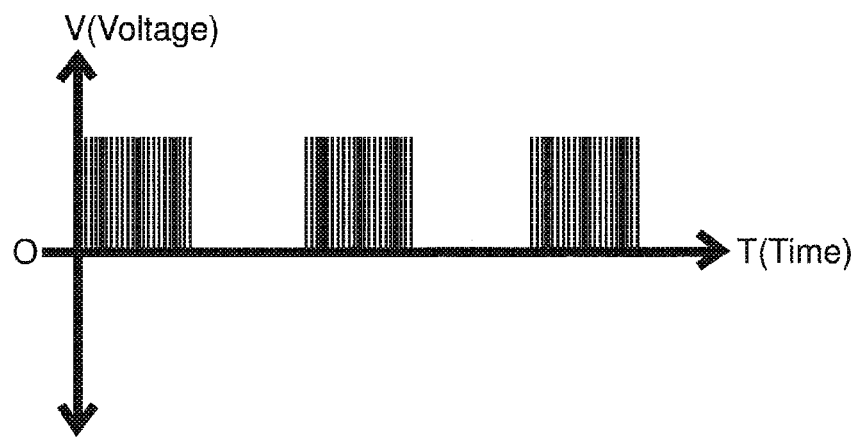
FIGS. 9A and 9B are schematic views of fifth exemplary wave forms of the superimposed time-varying frequency electromagnetic wave.
Figure 9B:
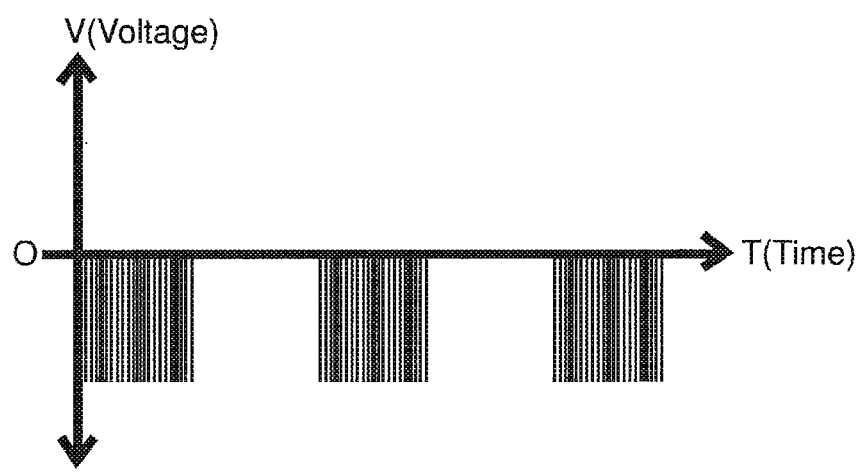

Now turning to FIG. 2, there is illustrated a system 200 constructed consistent with a second embodiment of the present invention. The system 200 of this embodiment is structurally same as the one shown in the first embodiment above, except that an inductive diode filter 216 is selected as the DC biasing unit. The inductive diode filter 216 functions to filter all or part of the positive or negative half of the time-varying frequency AC electromagnetic wave to yield an asymmetrical wave having only positive components or negative components. In this embodiment, the DAC wave is biased to have an amplitude toward only the positive or negative direction and generate the wave forms as shown in FIGS. 9A and 9B.

Figure 3A:
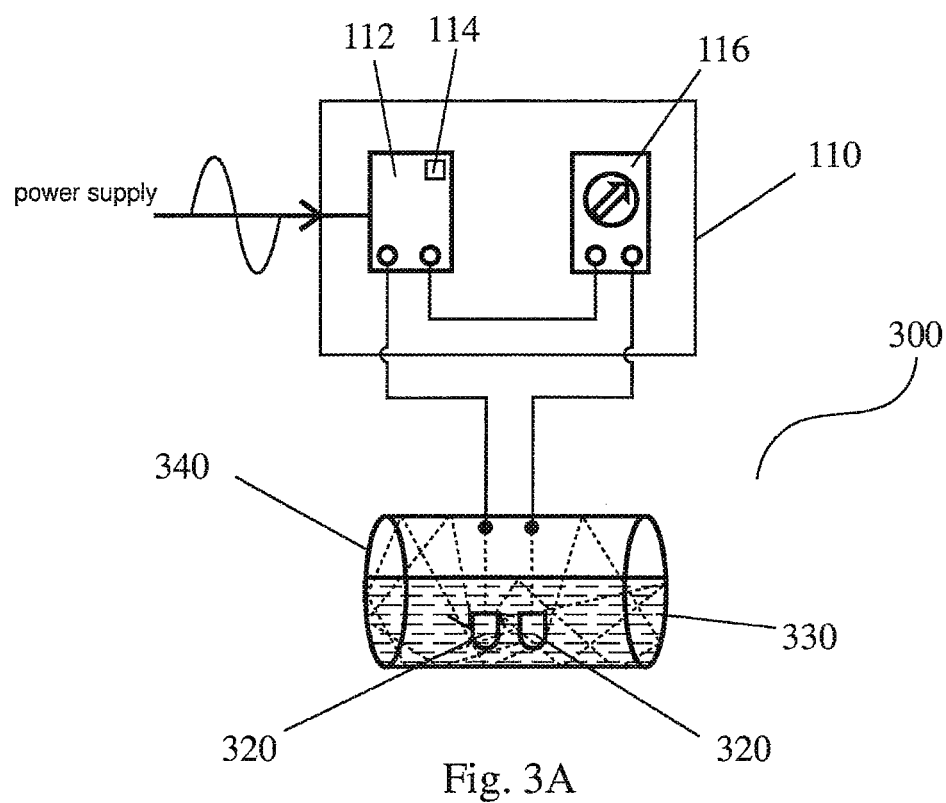
FIGS. 3A and 3B are a schematic view of an exemplary arrangement of a superimposed time-varying frequency electromagnetic wave system which is constructed in accordance with a third embodiment of the invention.
Figure 3B:
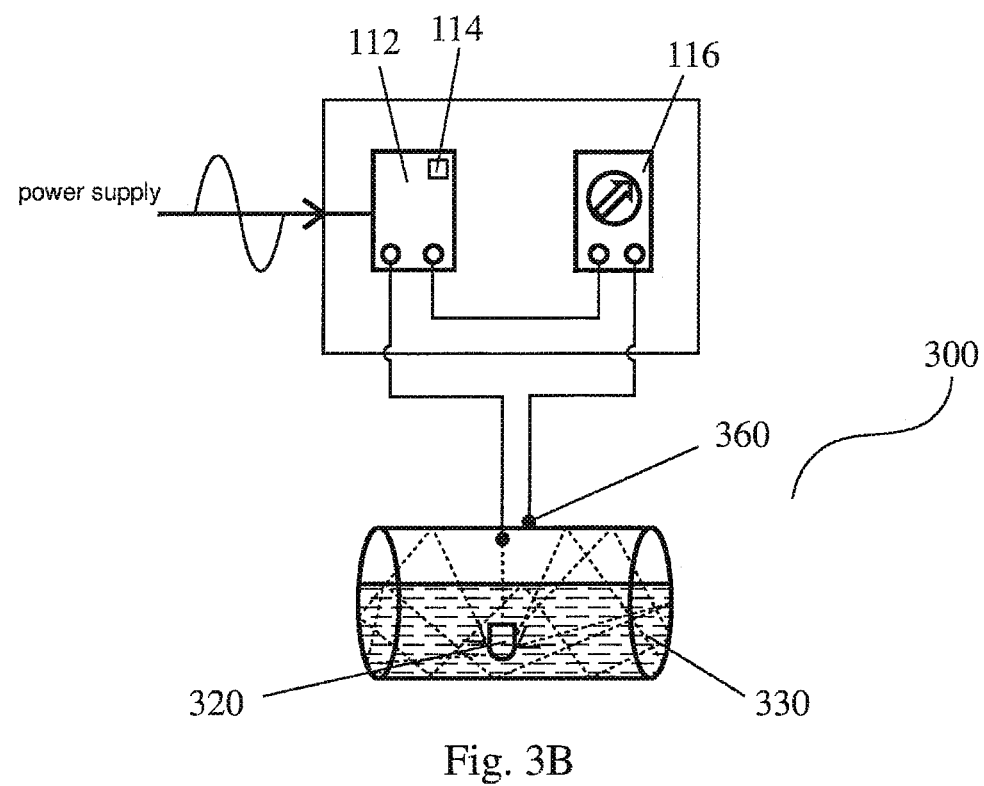

FIGS. 3A and 3B illustrate a system 300 constructed consistent with a third embodiment of the present invention. The system 300 of this embodiment is structurally the same as the one shown in the first embodiment above, except that the pipe 340 and the fluid such as water 330 flowing in the pipe 340 form together a target region to be treated. In FIG. 3A, the pipe 340 is made of a non-metallic material so the two actuators 320 are placed to connect with the first and second excitation sites located in the fluid. An inductor may be arranged to connect with the one of the excitation sites, if needed, to enhance the electromagnetic effect. In FIG. 3B, the pipe 340 is made of a metallic material. In this case, one actuator 320 is placed in the fluid. The other excitation site is positioned on the pipe 340 itself, and this excitation site is directly electrically coupled with the output terminal of the device for generating the DAC wave. It should be noted that the DAC wave can go randomly towards different directions in the liquid 330 and in the pipe 340, which ensures that many blind spots or zones in the liquid and in the pipe can be reached by the DAC wave and therefore are subject to the DAC wave treatment.

Figure 4A:
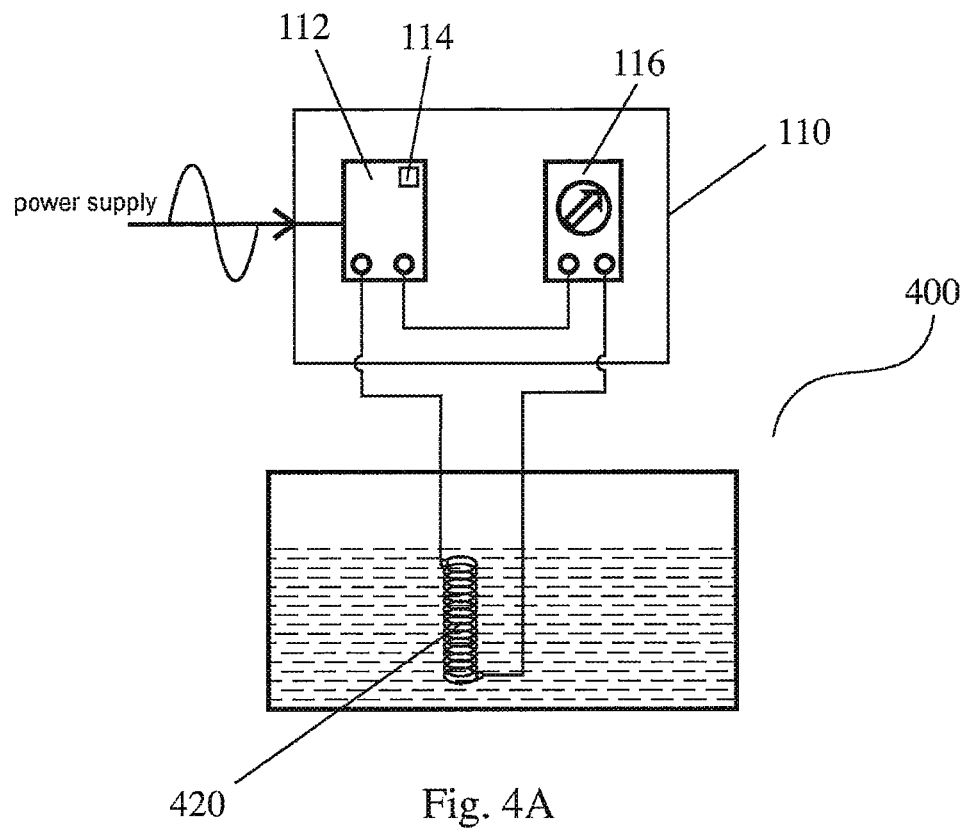
FIGS. 4A and 4B are a schematic view of an exemplary arrangement of a superimposed time-varying frequency electromagnetic wave system which is constructed in accordance with a fourth embodiment of the invention.
Figure 4B:
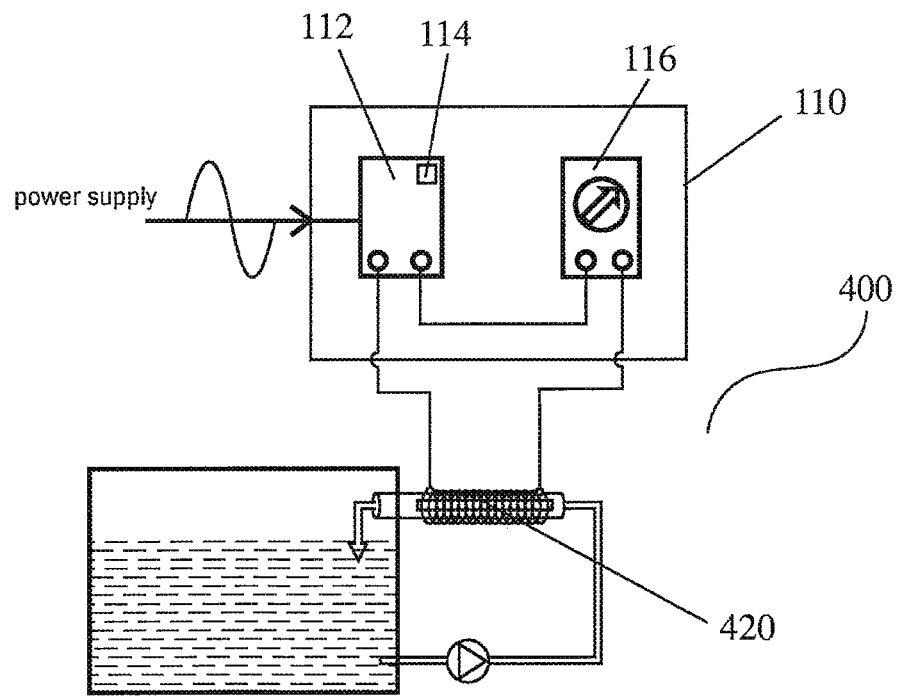

FIGS. 4A and 4B illustrate a system 400 constructed consistent with a fourth embodiment of the present invention. The system 400 of this embodiment is structurally the same as the one shown in the first embodiment above, except that the actuators are provided in the form of a coil 420 to excite the target region. Ferrite may be incorporated within the coil or outside the coil to enhance the magnetic field effect. Likewise, the coil 420 may be immersed in the liquid (FIG. 4A) or may be above the liquid (FIG. 4B).

In the method of the invention, the actuator may be placed in the water. The location of the actuator may be a long distance from the structure such that the potential gradient created in the electrolyte is the minimal. When the actuator is placed "remotely" from the structures or vice versa, the DAC wave will be able to distribute evenly across the entire structure surface, providing a uniform and complete corrosion protection.

The systems discussed in the above embodiments can produce the required DAC wave uniquely. The right system can be chosen for a specific application for the desired treatment effect.

The present invention provides a specific application of the DC superimposed time-varying AC pulsating ionic wave current described above for treatment of water in water systems.

The present invention provides an all-round solution to solve scaling, corrosion, bacteria (including *Legionella*) and algae control problems in one single treatment method. However, as described above, it achieves this without using any chemicals and without producing negative side effects, especially to the environment. Importantly, as well, it can be applied for both metallic and non-metallic structures as the treatment wave current is generated directly inside the water instead of using an external indirect "field" influence source.

In this invention, the time-varying superimposed DC pulsating ionic wave current is generated inside the bulk cooling water. For metallic structures, this is also generated on the metallic structure itself. In general, there may be multiple emitters placed in water in the system, such as in the cooling water sump or a suitable accessible submerged area.

The DC superimposed time-varying AC pulsating ionic wave current is then generated from the electronic generator and transmitted to the emitters placed in the water. Since it is a superimposed pulsating ionic wave current, the DC superimposed time-varying AC pulsating ionic wave current will flow in the bulk water. At the same time, the submerged metallic structures are also connected to the DC superimposed time-varying AC pulsating ionic wave current to receive direct excitation. The excitation effect of the DC superimposed time-varying AC pulsating ionic wave current in water increases the vibration and rotational internal energy of water clusters and dissolved ions plus the direct excitation of the metallic structure. It effectively produces an all-around control system for scaling, corrosion, bacteria and algae in different water systems such as, for example, cooling towers and water boilers.

Prior art treatment systems include: a) use of an external permanent magnet or electromagnet to generate a static "field" to treat water inside a pipe which, however, produces no measurable ionic current in the water; b) use of an electrostatic rod to generate a static "field" to treat water inside a pipe, which also produces no measurable ionic current in the water; or c) use of an external AC electromagnetic coil to generate an alternating "field" to treat water inside a pipe, which again produces no measurable ionic current in the water and the coil must be arranged on a non-metallic section.

Figure 11A:
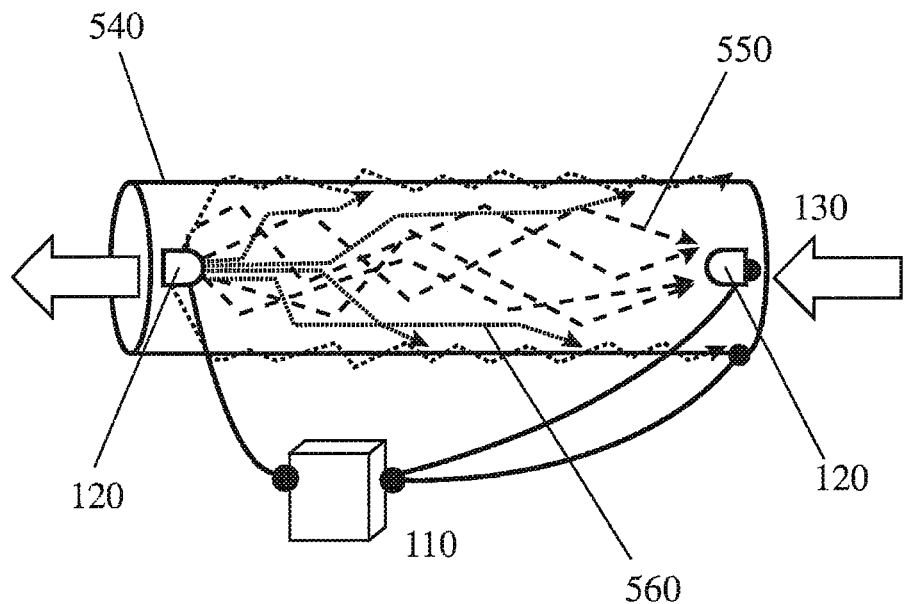
FIGS. 11A and 11B are schematic views of an exemplary superimposed DC pulsating ionic wave current system in accordance with the invention for treatment of water and a water system, for a metallic structure and non-metallic structure, respectively.
Figure 11B:
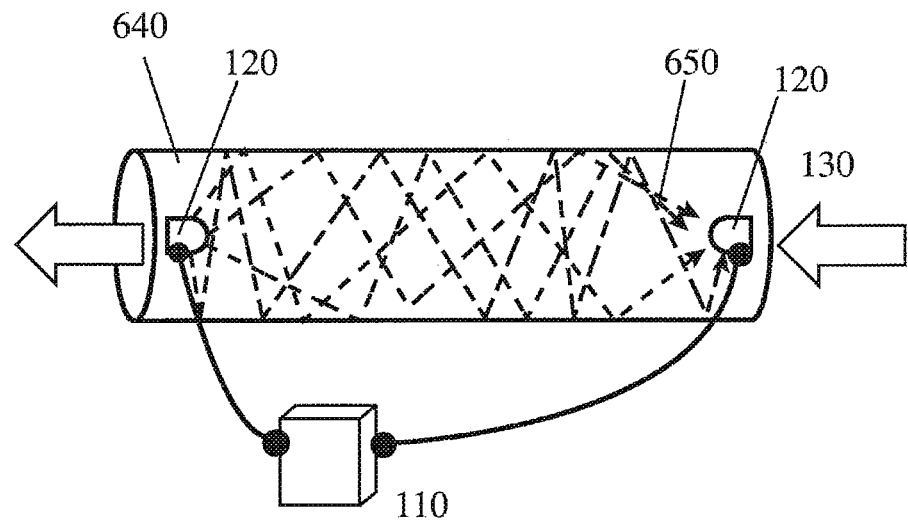

FIGS. 11A and 11B illustrate different treatment systems of the present invention. FIG. 11A shows a system as used with a metallic structure and FIG. 11B shows a system as used with a non-metallic structure.

As shown in FIG. 11A, for a metallic structure such as a pipe 540, through which water 130 flows, the DC superimposed time-varying AC pulsating ionic wave current is generated directly in the water 130, by the DC superimposed time-varying AC pulsating ionic wave current generator 110 through the emitters 120. There is a measurable pulsating ionic current in the water and on the metallic pipe wall 540, as indicated by dashed lines 550 and 560, respectively.

As shown in FIG. 11B, for a non-metallic structure, such as a pipe 640, the DC superimposed time-varying AC pulsating ionic wave current is generated directly in the water 130. There is measurable pulsating ionic current in the water 130, as indicated by dashed lines 650.

The DC superimposed time-varying AC pulsating ionic wave current in water 130 produced by the emitter 120 in this invention is different from the DC current which is produced by conventional DC electrolysis. In DC electrolysis, the ionic current produced in the water is non-vibrating, single directional constant DC current from anode to cathode and the magnitude of the DC current is fixed. The DC current produced in DC electrolysis always takes the shortest path with the least resistance and hence it is unable to reach corners and other hard to reach areas in the electrolyte. Although DC electrolysis is able to produce an ionic current in water, it is well known in electrochemistry that a DC current which has no vibration properties is unable to perform any water treatment function for scaling, corrosion or biological control. Electrode surface chemical reactions may produce some disinfectant by-products for disinfection purposes but the DC current itself has no effect on scale, corrosion or biological control functions. Even though DC electrolysis has been well known for many years, these reasons show why it is not used in present cooling water treatments.

The effect of the DC superimposed time-varying AC pulsating ionic wave current is also different from the combination of using an inductor coil water treatment plus a DC cathodic protection system. When using a separate inductor coil plus a DC cathodic protection system, the "field" generated by the inductor coil cannot produce a pulsating ionic wave current in the water even when there is a cathodic protection DC current flow in water. The "field" generated is unable to superimpose on the cathode protection DC "current" in water and cannot transform the constant "DC current" into a superimposed pulsating DC current. Essentially, for effective biological control in water, it is important to have the ionic current or charges flowing in the water to provide one of the basic mechanisms for inducing the "kill effect" to destroy various organisms. However, if this ionic current is too weak or the voltage applied/induced is too low to create a high potential gradient across the organism body, there will be no effect on the organisms. If the organism size is very small, as is the case with bacteria, the high potential gradient between the DC cathode and anode may still be insufficient to produce any significant potential gradient across the bacteria or microorganisms due to their small micron size bodies. In practice, there is also a safety limit to the voltage which can be applied between the cathode and anode. DC voltages exceeding 60V are not acceptable in water treatment practice due to safety reasons. Yet 60V DC is still too low a voltage to create the "kill" potential gradient across the bacteria or algae cell. Hence DC electrolysis current is unable to perform a bacteria or algae control function. In practice, many prior art systems use DC electrolysis to kill the organisms by producing metal ions (for example Cu or Ag), chlorine, hypochlorite or other chemical disinfectant bi-products at the electrode surface. All these systems use chemical reactions or chemical disinfection by-products to kill the organisms instead of the DC current itself. All these methods are classed as using chemical treatments and their environmental impact is undesirable.

If the ionic current flow in the water is a fixed frequency AC form, such as using 50 Hz AC sine wave electrolysis, there is no significant effect on the organisms unless the voltage and current are raised beyond the safe application limit.

For scale control in water systems, prior art systems have used permanent magnets and high voltage electrostatic rods to create a static "field" instead of a pulsating ionic wave current in water to control the formation of hard adhering calcite calcium carbonate scale. The AC electromagnetic treatments are also indirect and are generally inconsistent in performance, in particular for large flow rate cooling water such as power station cooling water systems. Another issue is that a coil treatment is typically installed at a section of the cooling water pipe and it is unable to affect the main bulk of water especially when the cooling tower is not operating. Hence it is difficult for such systems to achieve consistent scale control performance.

In contrast, in the present invention, the DC superimposed time-varying AC pulsating ionic wave current directly flows in the water and, as a consequence, it treats the water readily. As a consequence, it has been found that calcium carbonate can be precipitated out in bulk water very effectively in powdery form. With the bulk precipitation in water, the calcium carbonate will not form as hard adhering scale on a heat exchanger surface, hence solving the scaling problem.

It has been demonstrated by use of FTIR (Fourier Transform Infra-Red) and Raman spectroscopy, that the water containing the calcium ions has its internal vibration and rotational energy greatly increased by the treatment with the pulsating ionic current or charge flow in the water. It is this increase in internal vibration energy of the calcium-containing water that creates calcium carbonate nucleation sites in the bulk water, which leads to precipitation of the calcium carbonate in bulk water instead of on the heat transfer surface. In fact, with the pulsating ionic wave current in a cooling water system, precipitation of $CaCO_3$ due to increase in water internal vibration energy dominates and overtakes $CaCO_3$ precipitation due to the reverse solubility of $CaCO_3$ by the heating effect. This effect prevents the precipitation of calcium carbonate on the heated surface and hence controls scaling on a heat exchanger in a cooling water system. In this way, only powdery calcium carbonates are formed in the bulk water and hence the present invention solves the problem of hard scaling adhering on the heat exchanger surface.

With the increase in bulk water internal vibration energy, all the ions and charges in the water will be subjected non-selectively to the vibration/rotational excitation. Under such circumstances, it is found that with the DC superimposed time-varying AC pulsating ionic wave current treatment of the invention that silica in the water may also be precipitated together with the calcium carbonate, which also controls silica scaling.

The FTIR and Raman spectroscopy also shows that the water internal vibration and rotational energy is elevated and stored in the water after the DC superimposed time-varying AC pulsating ionic wave current treatment of the present invention. This excited energy has a long lasting residual effect, potentially up to a number of weeks, depending on the energy drain or dissipation in the system. This measurable residual effect enables the system to be configured in such a way that the charging of DC superimposed time-varying AC pulsating ionic wave current is at an optimum when treating a re-circulating cooling water system or a one-pass cooling water system.

Corrosion control in water systems such as a cooling water systems is also addressed by the present invention.

Corrosion in such cooling water systems is a complex issue but it can be broadly classified in the following.

General corrosion of the metallic structures in the system such as steel pipes, copper alloy condenser tubes, etc., in the entire cooling water system.

Pitting and crevice corrosion of the metallic structures in the cooling water system.

Dissimilar metal corrosion between, for example, galvanized pipes, mild steel structures, stainless steel drain covers, brass valves and copper ball floats, which normally takes place in the cooling tower water basin.

Most prior art systems are targeted at solving scaling problems but some prior art systems may use an induced field effect to produce a protective oxide $Fe_3O_4$ on a steel surface. In practice, such a coating is inadequate to provide full corrosion protection to steel although partial corrosion protection due to the iron oxide protection properties occurs.

The present invention uses the DC superimposed time-varying AC pulsating ionic wave current in the metallic structure to promote magnetite formation directly on the steel. In addition, it also excites the water and increases the water vibration and rotational internal energy such that it can transfer energy to the steel surface to promote magnetite formation. Simultaneously, the DC superimposed time-varying AC pulsating ionic wave current in water also suppresses and eliminates the micro-corrosion current leaving the steel surface and hence is capable of achieving a full corrosion protection. More specifically, in the present invention, the DC superimposed time-varying AC pulsating ionic wave current flows in the structure as well as in the water. General corrosion is controlled by two treatment effects. Firstly the pulsed current charge wave excites the steel surface directly by travelling along the steel structure surface and directly promotes the formation of magnetite. Secondly, when the water with high internal vibration and rotational energy comes into contact with the metallic structures in the cooling water system, the high internal vibration/rotational energy of water will dissipate energy to the metal surface and, together with the excited dissolved oxygen in water, it provides the elevated energy reaction conditions. As such, instead of forming the low energy $Fe_2O_3$ corrosion product, it will form into the higher energy corrosion product $Fe_3O_4$. The porous red $Fe_2O_3$ hematite rust has no protective property to the steel but the dense adhering $Fe_3O_4$ black magnetite coating has corrosion protection properties. $Fe_3O_4$ acts as an active protective coating blocking out further oxidation corrosion. The $Fe_3O_4$ magnetite forms a non-consumable yet conductive oxide layer. In addition to the magnetite layer formation, the DC superimposed time-varying AC pulsating ionic wave current flow direction is controlled such that it is emitted from the emitter through the water and enters the steel surface, and as such it further provides the function of suppressing any micro-corrosion current leaving the surface, and hence is able to shift the steel potential more negatively and achieves full corrosion protection. Pure AC pulsed wave without DC superimposition is unable to shift the steel potential more negatively to the required full corrosion protection potential.

Due to the way the DC superimposed time-varying AC pulsating ionic wave current flows in a structure and also in water, it is able to transmit through the full length and every part of the structure via the water and the structure itself. It also eliminates localized protection problems, especially as may be found in pipeline interiors treated by cathodic protection methods.

Since the high energy DC superimposed time-varying AC pulsating ionic wave current treated water flows to every part and extends to every corner of the cooling water system and structures, it is able to provide general corrosion protection for all pipeline internal surfaces and metal structures in contact with the cooling water.

A further effect of the DC superimposed time-varying AC pulsating ionic wave current method of the invention is that it directly excites the whole steel structure including any pits and hence it is easier for the magnetite to be generated inside such pits. Additionally and concurrently, the DC superimposed time-varying AC pulsating ionic wave current suppresses the current leaving the pit interior and hence is able to control pitting corrosion more effectively, enabling the steel structure to attain a full corrosion protection potential.

For a cooling water system, the problem of copper alloy condenser tube corrosion also is critical and may be more important than the problem of steel pipe corrosion. This is due to the fact that the copper alloy condenser tube wall is very much thinner than the steel pipe wall. For the case of copper alloy condenser tubes, at ground energy level conditions, the copper tubes are protected by both protective CuO and $Cu_2O$ copper oxides. When the tube metal material is excited directly by the DC superimposed time-varying AC pulsating ionic wave current as well as from DC superimposed time-varying AC pulsating ionic wave current treated water, it promotes the formation of a denser protective $Cu_2O$ layer, hence reducing the copper alloy corrosion rate and further enhancing the corrosion resistance of the copper alloy. Similarly to stainless steel, the metal oxide layer is further enhanced by the DC superimposed time-varying AC pulsating ionic wave current treatment and is shown to register a lower corrosion rate when measured by a corrosion meter.

In the case of dissimilar metal corrosion, which may be presented in a cooling tower water sump due to the presence of electrically interconnected multiple metallic members including brass valves, copper floats, galvanized pipes, black steel pipes, mild steel frames and supports, stainless steel drain covers and in some cases, the presence of a stainless steel sump or galvanized steel sump, the current discharging from the mild steel surface to the more noble materials is very active and strong. With such highly active dissimilar metals, the discharging current from the mild steel surface prevents the formation of magnetite on the steel surface and overrides the slow magnetite generation rate created by the indirect field influence methods of the prior art. Once the magnetite cannot be formed readily or evenly on the steel surface, accelerated corrosion including pitting corrosion will take place on the steel surface areas or spots which are not covered by magnetite. Hence the prior art systems cannot provide an effective action where there are dissimilar metal corrosion conditions.

In the DC superimposed time-varying AC pulsating ionic wave current process of the invention, the direction of the DC superimposed time-varying AC pulsating ionic wave current flow can be controlled in such a way that it provides an additional current-impressing function to suppress the corrosion current leaving the more active metal surfaces. For example, in a dissimilar metal corrosion case, if stainless steel and mild steel are present, then the DC superimposed time-varying AC pulsating ionic wave current flow can be controlled to flow from the emitter surface to both of these materials and suppress the corrosion current flow between the two dissimilar metals hence solving the dissimilar metals corrosion problem. In addition, the DC superimposed time-varying AC pulsating ionic wave current will also excite the mild steel material directly and effectively form the protective magnetite coating on the mild steel surface quickly.

FIGS. 12A, 12B, 13A, 13B, 14A and 14B illustrate methods of applying the invention in different applications.

FIG. 12A shows water 130 in a metallic cooling water sump 740a having cooling water pipes, condenser and other metallic structures 750a. An emitter 120 is placed in the water 130 and emitters 720 are attached to the metallic structure. Cables 760 connect the emitters 120,720 to the DC superimposed time-varying AC pulsating ionic wave current generator 110. FIG. 12B shows water 130 in a non-metallic cooling water sump 740b having cooling water pipes 750b of non-metallic material. Emitters 120 are placed in the water 130 and are connected to the DC superimposed time-varying AC pulsating ionic wave current generator 110 by cables 760.

FIGS. 13A and 13B show a boiler system. Fresh water is input as indicated by numeral 870 and boiler steam condensate is returned as indicated by numeral 880. FIG. 13A shows a metallic feed water tank 840a and FIG. 13B shows a non-metallic feed water tank 840b. For the metallic feed water tank 840a, the emitter 120 is placed in the boiler feed water 130 and an emitter 820 is attached to the water tank wall. Cables 860 connect the emitters 120, 820 to the DC superimposed time-varying AC pulsating ionic wave current generator 110. A DC superimposed time-varying AC pulsating ionic wave current is generated directly in the water 130 by the DC superimposed time-varying AC pulsating ionic wave current generator 110 through the emitters 120, 820. FIG. 13B shows an arrangement for a non-metallic tank 840b in which the emitters 120 are placed in the water 130. These emitters 120 may be rods or other shapes that extend through the tank 840b.

Figure 14A:
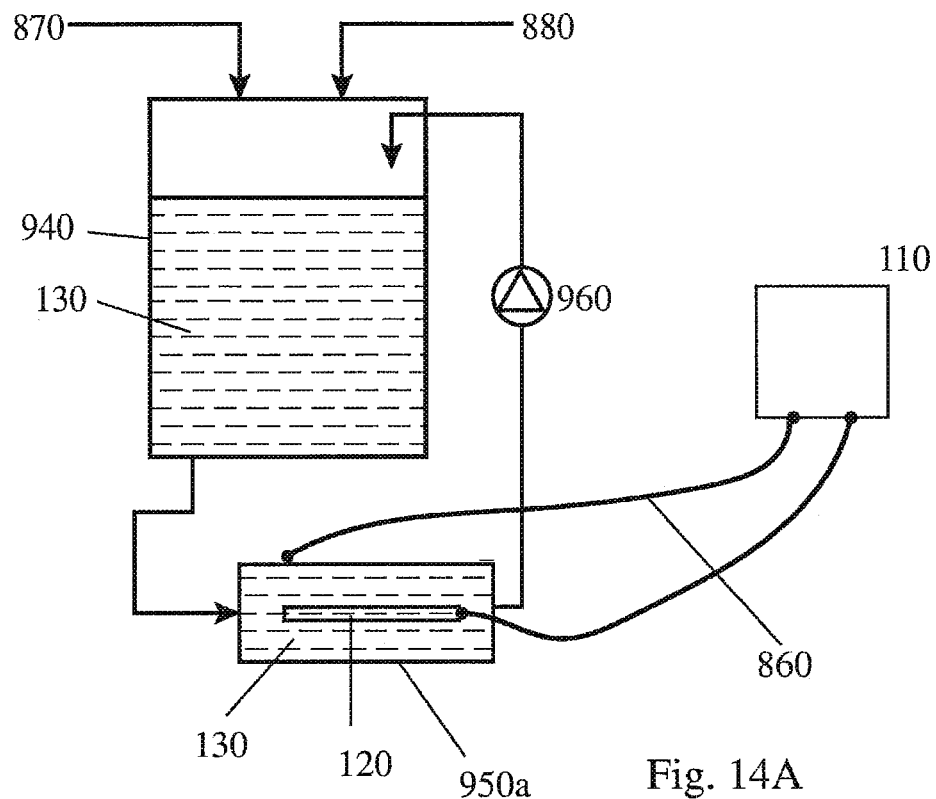
FIGS. 14A and 14B are schematic views of an exemplary superimposed DC pulsating ionic wave current system in accordance with the invention for treatment of water in a boiler system having an external treatment chamber that is of metallic and non-metallic material, respectively.
Figure 14B:
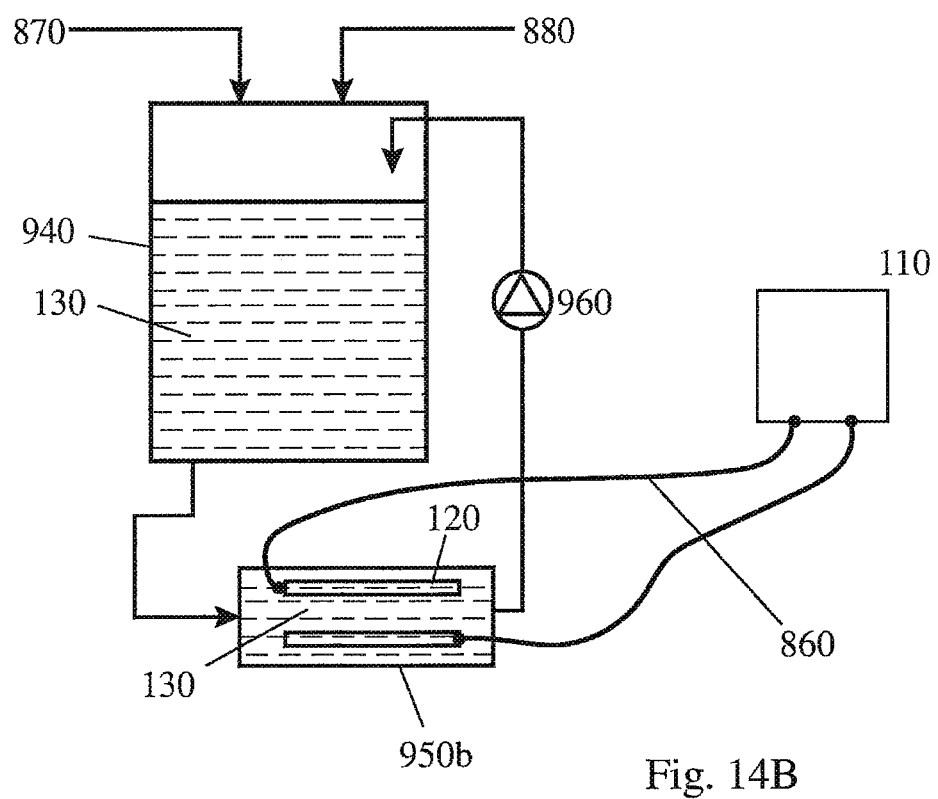

FIGS. 14A and 14B show a boiler system in which the water treatment is carried out externally from a non-metallic feed tank 940. An external feed water treatment chamber is provided, shown as a metallic chamber 950a in FIG. 14A and a non-metallic chamber 950b in FIG. 14b. The water from the tank 940 is circulated through the chamber 950a/950b by a recirculating feed water pump 960. Emitters 120 are placed in the chamber 950a/950b in similar operation to that described with reference to FIGS. 12A, 12B, 13A and 13B.

For all the embodiments of the invention the generation of the DC superimposed time-varying AC pulsating ionic wave current is as described above and consists of superimposing a direct current on a low frequency time-varying pulsating electromagnetic wave signal. The low frequency time-varying electromagnetic wave can be in sine, square, triangular or even in random form. However, the frequency range preferably operates in the range from 100 Hz to 1 MHz and varies with a sweeping frequency of 1 to 1000 Hz. The selection of the range of frequency and also the sweeping frequency will be determined by the fluid quality, flow rate, and treatment purpose such as for control of scaling, corrosion, bacteria, algae and other targeted treatments.

In the method of the invention, the ionic wave current strength including the magnitude of the superimposed DC component strength is critical in delivering the correct treatment effect and it has to match the frequency range applied.

For bacteria and water-borne organism control, the frequency range has an important effect. In general, for organisms larger than 50 microns, using a lower frequency range of less than 50K Hz range but with a high ionic wave current such as 10 or 100 amps will have a good effect to control the organisms. Usually, the organisms are not killed immediately when they are exposed to the DC superimposed time-varying AC pulsating ionic wave current treatment, but will die within hours or days after treatment. However, it has been found that their multiplication rate is greatly reduced from the time of treatment. For smaller organisms of 10~50 μm, and bacteria control, higher frequency ranges are needed. However, the limit on the higher frequency is very much determined by the capability of the PCB switching component that produces the wave frequency. In general, the circuit current achievable is inversely proportional to the frequency range. For effective control of *Legionella* bacteria, it is important that the ionic wave current in the water has an r.m.s. value of, preferably, more than 0.1 amps. The current output from the emitter in water is controlled by the PCB power supply applied voltage and the overall total loop resistance between the emitters and including the emitter-to-electrolyte resistance. Hence the water conductivity may need to be controlled such that the minimum emitter current in the water can be maintained whilst not exceeding the current capacity of the PCB.

For algae control, the DC superimposed time-varying AC pulsating ionic wave current acts to burst the algae chloroplast. It is therefore important that the ionic wave current amperage strength is maintained. Generally a frequency range of 100 Hz to 200 kHz is required, depending on the algae species. The DC superimposed time-varying AC pulsating ionic wave current treatment on algae has also been shown to have a residual control effect that limits re-growth with a lasting effect. When water that had been treated by the method of the invention was subjected to a 14 days re-growth test, it was found that the algae had lost the ability to reproduce. For algae control, it is important that the ionic current strength in water should not be less than 0.1 amp and preferably exceeding 0.5 amps. Regardless of the direction of the ionic wave current flow in the water, the treatment effect on algae and bacteria control is the same. However, for all practical purpose, for effective control of algae in freshwater, the applied voltage across the DC superimposed time-varying AC pulsating ionic wave current emitters should preferably be as close as possible to the allowable safety limit such as 48V or 60V, as appropriate. In the event that the DC superimposed time-varying AC pulsating ionic wave current in water becomes too high due to the high conductivity of the water, a frequency modulating control such as described in WO 2014/035332 may be used, to maintain the required high voltage and limit the maximum amount of current flow.

For corrosion control, the direction of the DC superimposed time-varying AC pulsating ionic wave current wave current is critical and the DC superimposed time-varying AC pulsating ionic wave current in the water must be flowing in the direction in which it enters the submerged metallic surface. For protection of metallic objects, the DC superimposed time-varying AC pulsating ionic wave current with a frequency range from 100 Hz to 1 MHz varied with a sweeping frequency of 1 to 1000 Hz is imposed. In parallel with the imposed DC superimposed time-varying AC pulsating ionic wave current which suppresses any micro-corrosion current leaving the steel surface, the material of the metallic structure is also excited by the pulsating DC superimposed time-varying AC pulsating ionic wave current both internally and on the surface. Within a short period of time a protective coating of magnetite is generated on the steel surface.

In contrast, with use of conventional fixed frequency waves, the skin effect of the travelling wave in a conductive material is determined by the wave frequency. In general, a fixed frequency wave will travel at the "skin" or close to the metallic surface if the frequency is high and inside the conductive material if the frequency is low. However, under the DC superimposed time-varying AC pulsating ionic wave current ionic wave excitation, the generation of the magnetite layer is not related to the skin effect of the wave. Instead it is dependent on the applied frequency which can be set to the correct resonating frequency for the metallic molecular structures. In fact, as low as a few hundred hertz can be sufficient to promote the magnetite formation.

The DC superimposed time-varying AC pulsating ionic wave current method of the invention uses both the direct current excitation to form magnetite by directly passing DC superimposed time-varying AC pulsating ionic wave current inside the metal and also the indirect transfer of energy from the DC superimposed time-varying AC pulsating ionic wave current treated water through the submerged metal surface to form the magnetite. This dual effect mechanism for corrosion control and magnetite formation is different from the prior art which creates no ionic current in the water or metal. Yet another major difference of the DC superimposed time-varying AC pulsating ionic wave current treatment from prior art treatments is due to the wave current entering the steel surface, which causes the steel potential to shift to a more negative potential direction and also shifts it into the "immunity zone" as shown on a Pourbaix diagram. In addition, the direct excitation of the steel material also enlarges the "passivation zone" as shown on a Pourbaix diagram, which indicates that the generation of magnetite can take place at lower pH and also at more positive steel potential. These dual steel corrosion protection functions of the DC superimposed time-varying AC pulsating ionic wave current therefore allow the steel to achieve a full corrosion protection level which is not achievable by prior art methods.

For effective production of magnetite on steel surface or other metallic structure, the direct excitation voltage on the steel may be controlled and limited by the frequency modulating control of the invention.

The amount of the superimposing DC component is determined by the structure surface to be protected and also the water quality. If the water has a high content of chloride, the current density must be carefully regulated to eliminate chlorine generation. If chlorine or hypochlorite generation must be avoided, then more reactive electrode materials such as magnesium or cadmium-based zinc alloy may be used as the emitter material to eliminate the generation of chlorine gas.

With the method of the invention, scaling control is promoted mainly by the direct excitation of water clusters including calcium and bicarbonate/carbonate ions via the ionic wave current in the water although there is also minor effect from the electromagnetic field generated at the vicinity of the emitter. This direct excitation charges the water cluster directly and when the DC superimposed time-varying AC pulsating ionic wave current charging is switched off, the water will still carry a charge potential with respect to ground and this charge current in the water can be measured. The formation of nucleation sites in calcium carbonate is sensitive to the magnitude of the DC superimposed time-varying AC pulsating ionic wave current in the water and also the applied frequency range. To precipitate calcium carbonate effectively in the water, the ionic current strength measured in the water should not be less than 0.1 amp, and preferably can be 0.5 amps or more. This current is then coupled with 1 to 1000 Hz of sweeping frequency for the frequency range of 100 Hz to 1 MHz.

For the same applied frequency range and current strength of DC superimposed time-varying AC pulsating ionic wave current, silica may also co-precipitate with the calcium carbonate. In general, for effective co-precipitation of silica, it is preferable for the Ca concentration ppm to be higher than the silica ppm.

The invention provides for the control of all the above four water treatment functions including scaling, corrosion, bacteria and algae control. The frequency range and strength of the ionic current applied and measured in water is preferably in the following ranges for effective coverage for all four treatment functions.

1) Preferred ionic current strength in water >0.1 amps.
2) Preferred voltage applied across emitters not less than 12V.
3) Sweeping frequency range 10 to 500 Hz.
4) Ionic wave frequency range 500 Hz to 200 KHz.
5) If alternating DC biased DC superimposed time-varying AC pulsating ionic wave current is used, the alternating frequency is $\frac{1}{100}$ to 1000 Hz.
6) The alternating DC biased DC superimposed time-varying AC pulsating ionic wave current can be fixed frequency, time-varying frequency or random.

For use in a cooling tower, as shown in FIGS. 12A and 12B, if the submerged cooling tower sump is made of metal, it can be used as the emitter which then receives the net DC superimposed time-varying AC pulsating ionic wave current from the other emitter. The submerged metallic pipes, condenser tubes or other structures within the cooling water system can also be used in the same way as the receiving emitter.

If there is no corrosion control required in a system, or for simplicity of installation, then the metallic structures may not be connected as one of the emitters but two emitters may be installed separately in the water to perform the water excitation function. Under such circumstances, the DC superimposed time-varying AC pulsating ionic wave current emitters can be made to alternate in positive and negative directions at a preferable frequency of $\frac{1}{100}$ Hz to 1000 Hz. However, the emitters should be placed away from metallic structure to avoid the DC superimposed time-varying AC pulsating ionic wave current travelling only through a metallic path and by-passing the water path.

This alternating DC polarity frequency can be a fixed frequency or it can be time-varying or a random frequency range. An alternating DC polarity frequency range wider than about $\frac{1}{100}$ ~1000 Hz may also be used and effective bacteria, algae and scaling control can be achieved but there are other disadvantages. These include issues such as at too low a frequency there may be calcareous deposit on the emitter which will reduce the emitter DC superimposed time-varying AC pulsating ionic wave current discharge amperage and hence its performance. At the other extreme, at higher alternating switching frequencies, there may be problems with handling the high DC superimposed time-varying AC pulsating ionic wave current amperage. In any case, if the metallic structure is not connected to the emitter circuit and only two separate emitters are used to generate the DC superimposed time-varying AC pulsating ionic wave current in water for corrosion control, then an alternating DC superimposed time-varying AC pulsating ionic wave current may be used.

When the DC superimposed time-varying AC pulsating ionic wave current is applied in boiler water treatments, the emitters can be placed in the feed water tank or placed in line in the feed water pipe from the feed water tank to boiler, as shown in FIGS. 13A and 13B. Alternatively, the emitter pairs may also be placed in a separate treatment chamber to treat the feed water from the feed water tank, as shown in FIGS. 14A and 14B. In boiler water treatment, only the scaling and corrosion control issues may need to be considered as biological control may not be required due to the high water temperatures.

The invention thus provides a system and a method for applying a superimposed time-varying frequency electromagnetic wave to water and water systems which is very simple, relatively inexpensive, and more environmentally sound than prior art methods; and which is effective in providing various treatments in one go. In this invention, the DC superimposed time-varying AC pulsating ionic wave current can propagate in all directions to cover the entire target object and region, thus giving a more effective total treatment than provided by prior art treatments.

Preferences and options for a given aspect, feature or parameter of the invention should, unless the context indicates otherwise, be regarded as having been disclosed in combination with any and all preferences and options of all other aspects, features and parameters of the invention.

While the embodiments described herein are intended as an exemplary system and method, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

The invention claimed is:

1. A method for treating water within a water system to control one or more of scaling, corrosion, bacteria, and algae, the method comprising the steps of:
   generating a superimposed time-varying frequency electromagnetic wave in which an AC driving signal with time-varying frequency is riding on a DC output with a predefined DC bias voltage to provide a DC superimposed time-varying AC pulsating ionic wave current,
   transmitting the DC superimposed time-varying AC pulsating ionic wave current to one or more emitters placed in the water or in both the water and the water system, subjecting the water and the water system to the generated DC superimposed time-varying AC pulsating ionic wave current so as to excite the water or both the water and the water system,
   wherein the predefined DC bias voltage is set to be variable or fixed and the excitation causes a flow of ionic current having a DC component travelling in a pulsating and time-varying manner in the water or in both the water and the water system and induces vibration of electrons and molecules of the water or of both the water and the water system.

2. The method as claimed in claim 1, wherein the DC output is generated by a DC biasing unit selected from the group consisting of switch mode DC power supply, an AC to DC converter, a rechargeable DC battery and an inductive diode filter.

3. The method as claimed in claim 1, wherein the generating step comprises configuring the superimposed time-varying frequency electromagnetic wave to have polar asymmetry or become a unidirectional pulsating wave.

4. The method as claimed in claim 1, wherein the generating step comprises configuring the superimposed time-varying frequency electromagnetic wave to have half-wave distortion or full-wave distortion.

5. The method as claimed in claim 1, wherein the frequency of the superimposed time-varying frequency electromagnetic wave is between about 100 Hz and about 1 MHz.

6. The method as claimed in claim 5, wherein the frequency of the superimposed time-varying frequency electromagnetic wave is between about 500 Hz and about 200 KHz.

7. The method as claimed in claim 1, wherein the superimposed time-varying frequency electromagnetic wave has a sweeping frequency between about 1 Hz and about 1 KHz.

8. The method as claimed in claim 7, wherein the superimposed time-varying frequency electromagnetic wave has a sweeping frequency between about 10 Hz and about 500 Hz.

9. The method as claimed in claim 1, wherein the generated time-varying superimposed DC pulsating ionic wave current is a biased alternating DC current having fixed frequency, time-varying frequency or random.

10. The method as claimed in claim 1, wherein the generated DC superimposed time-varying AC pulsating ionic wave current is a biased alternating DC current having an alternating frequency of 1/100 to 1000 Hz.

11. The method as claimed in claim 1, wherein the ionic current strength in the water is >0.1 amps.

12. The method as claimed in claim 11, wherein the ionic current strength in the water is >0.5 amps.

13. The method as claimed in claim 1, wherein the water system comprises a metallic housing and the DC superimposed time-varying AC pulsating ionic wave current is controlled to flow in the water and the housing and form a magnetite layer on the surface of the housing.

14. The method as claimed in claim 1, wherein the DC superimposed time-varying AC pulsating ionic wave current is controlled to flow in the water and cause precipitation of calcium carbonate and/or silica in the water.

15. The method as claimed in claim 1, further comprising the step of controlling a negative return current of the DC superimposed time-varying AC pulsating ionic wave from the water system, the water system being a metallic structure, such that the DC superimposed time-varying AC pulsating ionic wave is distributed across the metallic structure surface and directly excites a target region of the metallic structure, and the excitation induces a flow of ionic current having a DC component travelling in a pulsating and time-varying manner in the target region and effects induced vibration of electrons and molecules in the target region.

16. A system for treating water within a water system to control one or more of scaling, corrosion, bacteria, and algae, the system comprising:
   a device for generating a superimposed time-varying frequency electromagnetic wave and having at least two output terminals, the device comprising an alternating current (AC) wave generator for generating an AC driving signal of AC electromagnetic wave having a time-varying frequency at a desired sweeping time, and a direct current (DC) biasing unit electrically coupled in series with the AC wave generator and for producing a DC output with a predefined DC bias voltage, the DC biasing unit being configured such that the DC output is mixed with the AC driving signal to produce a DC superimposed time-varying AC pulsating ionic wave current in which the time-varying frequency AC wave is riding on the predefined DC bias voltage and the DC bias voltage is controlled to vary continuously or in steps and at less than a peak voltage of the AC driving signal, and an emitter provided at one or each of both of a first excitation site and a second excitation site in the water or in both the water and the water system and electrically coupled in series with the at least two output terminals of the device, wherein the device is electrically coupled in series with the first excitation site and the second excitation site of the water or of both the water and the water system directly or through the emitter, such that the DC superimposed time-varying AC pulsating ionic wave current is applied to the water or to both the water and the water system, and the DC bias output and the AC driving signal are superimposed such that the superimposed time-varying frequency electromagnetic wave is able to induce a flow of ionic current having a DC component travelling in a pulsating and time-varying manner in the water or in both the water and the water system and effect induced vibration of electrons and molecules of the water or of both the water and the water system.

17. The system as claimed in claim 16, wherein the DC biasing unit is selected from the group consisting of switch mode DC power supply, an AC to DC converter, a rechargeable DC battery and an inductive diode filter.

18. The system as claimed in claim 16, wherein the water system comprises a housing which may be metallic or nonmetallic.

19. The system as claimed in claim 18, wherein the housing is made of an electrically non-conductive material, and if the first and/or second excitation sites are positioned on the electrically non-conductive substrate, the emitter is provided at the respective excitation site to be electrically coupled with the device.

20. The system as claimed in claim 16, wherein both the first and second excitation sites are positioned on the water system or in the water in a spaced relation, or one of the first and second excitation sites is positioned on the water system, and the other is positioned in the water.

21. The system as claimed in claim 16, wherein the AC wave generator comprises a control unit configured to generate a signal having the time-varying frequency at the desired sweeping time, and one or more bridge-type circuit coupled to the control unit for receiving the signal generated from the control unit, the bridge-type circuit being driven by the received signal to generate and amplify the AC driving signal of the time-varying frequency AC electromagnetic wave, wherein the bridge-type circuit is configured to comprise one or more half-bridge driver integrated circuits (ICs) and one or more Metal Oxide Semiconductor Field Effect Transistors (MOSFETs) coupled to the respective half-bridge driver ICs.

22. The system as claimed in claim 16, wherein the control unit comprises a programmable integrated circuit (IC) for time-varying the frequency of the AC driving signal, and optionally a stabilizer circuit for stabilizing the AC driving signal.

* * * * *